US012676255B2

(12) United States Patent
Koda et al.

(10) Patent No.: US 12,676,255 B2
(45) Date of Patent: *Jul. 7, 2026

(54) R-T-B BASED PERMANENT MAGNET

(71) Applicant: TDK CORPORATION, Tokyo (JP)

(72) Inventors: Atsushi Koda, Tokyo (JP); Takahiro Suwa, Tokyo (JP); Hikaru Kudo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 447 days.

This patent is subject to a terminal disclaimer.

(21) Appl. No.: 18/266,168

(22) PCT Filed: Nov. 10, 2021

(86) PCT No.: PCT/JP2021/041374

§ 371 (c)(1),
(2) Date: Jun. 8, 2023

(87) PCT Pub. No.: WO2022/123991

PCT Pub. Date: Jun. 16, 2022

(65) Prior Publication Data

US 2024/0038420 A1 Feb. 1, 2024

(30) Foreign Application Priority Data

Dec. 9, 2020 (JP) ................................ 2020-204543

(51) Int. Cl.

*H01F 1/057* (2006.01)
*B22F 3/16* (2006.01)

(Continued)

(52) U.S. Cl.

CPC .............. *H01F 1/0577* (2013.01); *B22F 3/16* (2013.01); *B22F 3/24* (2013.01); *B22F 9/023* (2013.01);

(Continued)

(58) Field of Classification Search

None

See application file for complete search history.

(56) References Cited

U.S. PATENT DOCUMENTS

2015/0132178 A1* 5/2015 Suzuki .................. C22C 38/002 420/83
2016/0307675 A1* 10/2016 Tada ..................... H01F 1/0577

FOREIGN PATENT DOCUMENTS

JP 2018-174323 A 11/2018

OTHER PUBLICATIONS

Machine translation of JP2018174323A (Japanese language document published Nov. 8, 2018).*

(Continued)

*Primary Examiner* — Christopher S Kessler
(74) *Attorney, Agent, or Firm* — Oliff PLC

(57) ABSTRACT

An R-T-B permanent magnet that contains: main-phase grains composed of an $R_2T_{14}B$ compound (where R is a rare earth element, T is a transition metal element, and B is boron); and grain boundaries. R includes Ce. The R-T-B permanent magnet has a Ce content of 15-35 mass % with respect to the total R content. The grain boundaries include an R-rich phase and an R-T phase. In a cross section of the R-T-B permanent magnet, the surface area ratio S(R-T) of the R-T phases with respect to the grain boundaries is 0.60-0.85.

18 Claims, 5 Drawing Sheets

(51) Int. Cl.

| | |
|---|---|
| ***B22F 3/24*** | (2006.01) |
| ***B22F 9/02*** | (2006.01) |
| ***B22F 9/04*** | (2006.01) |
| ***C22C 38/00*** | (2006.01) |
| ***C22C 38/06*** | (2006.01) |
| ***C22C 38/10*** | (2006.01) |
| ***C22C 38/14*** | (2006.01) |
| ***C22C 38/16*** | (2006.01) |

(52) U.S. Cl.

CPC .............. *B22F 9/04* (2013.01); *C22C 38/002* (2013.01); *C22C 38/005* (2013.01); *C22C 38/06* (2013.01); *C22C 38/10* (2013.01); *C22C 38/14* (2013.01); *C22C 38/16* (2013.01); *B22F 2003/248* (2013.01); *B22F 2009/044* (2013.01); *B22F 2201/02* (2013.01); *B22F 2201/11* (2013.01); *B22F 2201/20* (2013.01); *B22F 2202/05* (2013.01); *B22F 2301/355* (2013.01); *B22F 2998/10* (2013.01); *B22F 2999/00* (2013.01); *C22C 2202/02* (2013.01)

(56) References Cited

OTHER PUBLICATIONS

Jun. 13, 2023 International Preliminary Report on Patentability issued in International Patent Application No. PCT/JP2021/041374.

* cited by examiner

R-T-B BASED PERMANENT MAGNET

TECHNICAL FIELD

The present disclosure relates to an R-T-B based permanent magnet.

BACKGROUND

Patent Document 1 discloses an R-T-B based permanent magnet including Ce as R, and also discloses that the R-T-B based permanent magnet includes R-T phases with in a predetermined range. Due to such characteristics, the R-T-B based permanent magnet with improved bending strength can be obtained Patent Document 1: JP Patent Application Laid Open No. 2018-174323

SUMMARY

In general, among rare earth elements, the cost of Ce is low. Hence, it is demanded to produce a rare earth magnet having sufficient magnetic properties, particularly of sufficient coercivity (HcJ), by using Ce.

The object of the present disclosure is to provide a low cost rare earth magnet which includes Ce, and to provide the rare earth magnet with a high HcJ.

In order to achieve the above object, the R-T-B based permanent magnet according to the present disclosure includes main phase grains including an $R_2T_{14}B$ compound (in which R includes a rare earth element, T includes a transition metal element, and B represents boron), and a grain boundary, wherein

- R at least includes Ce,
- an amount of Ce to a total amount of R in the R-T-B based permanent magnet is within a range of 15 mass % or more and 35 mass % or less,
- the grain boundary includes an R-rich phase and an R-T phase, and
- an area ratio of the R-T phase to the grain boundary in one cross section of the R-T-B based permanent magnet represented by S(R-T) is within a range of 0.60 or larger and 0.85 or smaller.

An amount of Ga may be within a range of 0 mass % or more and 0.2 mass % or less.

The R-T-B based permanent magnet may include neither La nor Y.

DETAILED DESCRIPTION

Figure 1:
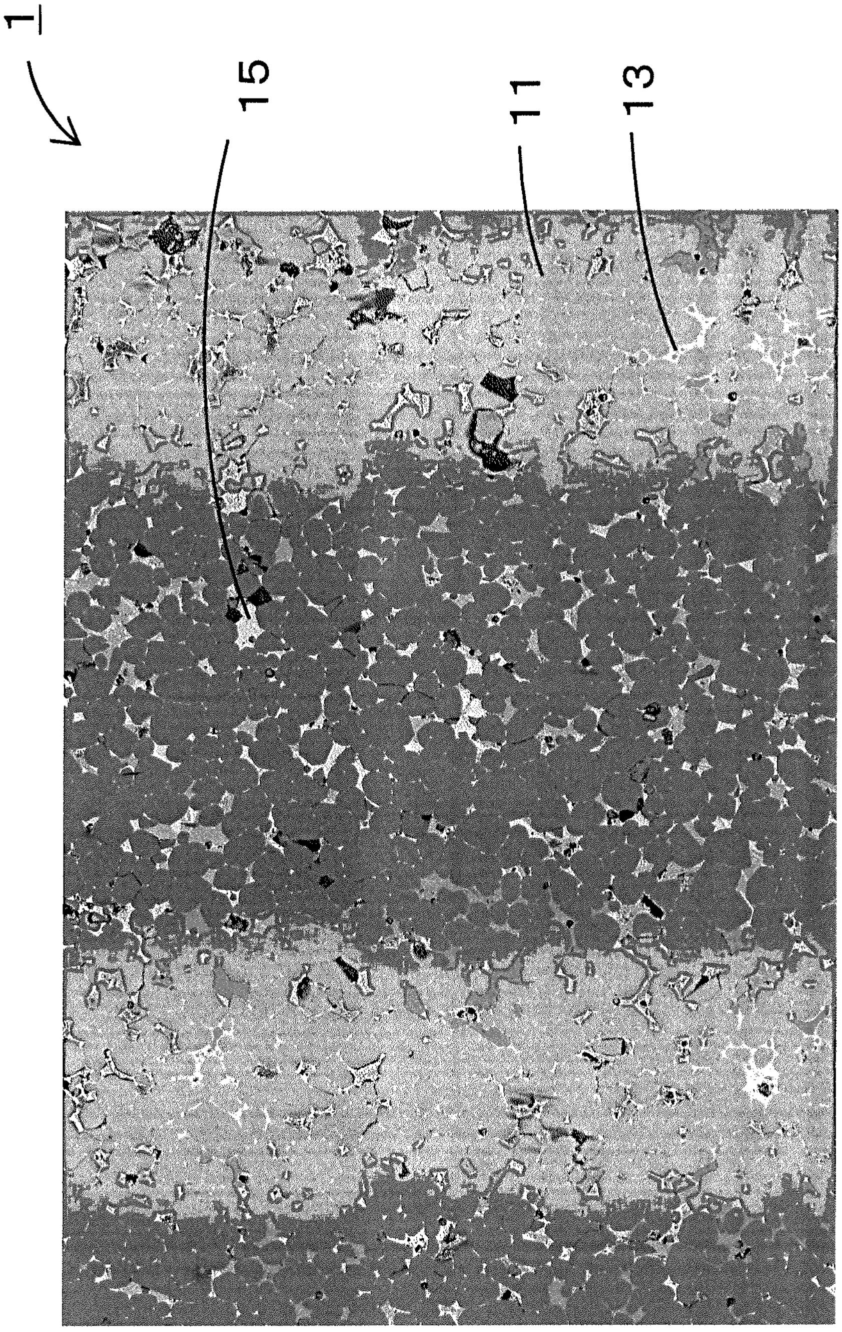
FIG. 1 is a SEM image of Example 1.

In below, the present disclosure is described based on embodiments. An R-T-B based permanent magnet of the present disclosure may be an R-T-B based sintered magnet.

(Composition)

A composition of the R-T-B based sintered magnet is described. R includes a rare earth element. R at least includes cerium (Ce). Since R includes Ce, a material cost is reduced. Further, an R-d phase described in below tends to be easily included in a grain boundary. Also, in order to suitably control the material cost of the R-T-B based sintered magnet and magnetic properties of the R-T-B based sintered magnet, R may include at least one selected from neodymium (Nd) and praseodymium (Pr).

T includes a transition metal element. T may include iron group elements (iron (Fe), cobalt (Co), and nickel (Ni)). T may be Fe, or a combination of Fe and Co. B represents boron.

Further, the R-T-B based sintered magnet may include at least one selected from metal elements other than the transition metal elements. For example, at least one selected from aluminum (Al) and gallium (Ga) may be included. Further, carbon (C) may be included as well.

In below, an amount of each element in the R-T-B based sintered magnet is described.

The amount of each element in the R-T-B based sintered magnet is not particularly limited. A total amount of R may be within a range of 30.00 mass % or more and 34.00 mass % or less, or within a range of 32.00 mass % or more and 34.00 mass % or less to 100 mass % of the R-T-B based sintered magnet as a whole. Note that, the amount of each element shown in below indicates an amount with respect to 100 mass % of the R-T-B based sintered magnet as a whole, unless mentioned otherwise.

An amount of B may be within a range of 0.70 mass % or more and 0.95 mass % or less, or within a range of 0.80 mass % or more and 0.90 mass % or less.

An amount of Co may be within a range of 0.50 mass % or more and 3.00 mass % or less, or may be within a range of 2.00 mass % or more and 3.00 mass % or less.

The R-T-B based sintered magnet may or may not include Ga. An amount of Ga may be within a range of 0 mass % or more and 0.20 mass % or less, or within a range of 0 mass % or more and 0.10 mass % or less. The smaller the amount of Ga is, the smaller the S(R-T) (an area ratio of R-T phase to the grain boundary phase) tends to be. Also, the smaller the amount of Ga is, HcJ tends to improve.

The R-T-B based sintered magnet may or may not include Al. An amount of Al may be within a range of 0.20 mass % or more and 1.00 mass % or less, or may be within a range of 0.30 mass % or more and 0.90 mass % or less.

The R-T-B based sintered magnet may or may not include copper (Cu) as T. An amount of Cu may be within a range of 0 mass % or more and 0.50 mass % or less, or may be within a range of 0 mass % or more and 0.25 mass % or less.

The R-T-B based sintered magnet may or may not include zirconium (Zr). An amount of Zr may be within a range of 0.10 mass % or more and 1.00 mass % or less, or may be within a range of 0.40 mass % or more and 0.60 mass % or less.

The amount of Ce to the total amount of R may be within a range of 15 mass % or more and 35 mass % or less. It may also be within a range of 15 mass % or more and 25 mass % or less. By having the amount of Ce to the total amount of R within the above-mentioned range, the below described S(R-T) tends to easily be within a range of 0.60 or larger and 0.85 or less. As a result, HcJ and below described HcJ/Ha tend to become higher. When the amount of Ce to the total amount of R is 15 mass % or more, a raw material cost can be reduced sufficiently. When the amount of Ce to the total amount of R is too small, it becomes difficult to sufficiently reduce the material cost. This is because the disadvantage which is a complicated production step caused by using plurality of types raw material metals including the rare earth elements outweighs the advantage of using Ce that is the lower cost compared to other rare earth elements.

A total amount of heavy rare earth elements included may be within a range of 0 mass % or more and 0.10 mass % or less. The larger the amount of the heavy rare earth elements is, the easier it is for HcJ to increase but the cost will increase. Also, the larger the amount of the heavy rare earth element is, Br tends to decrease easier. The heavy rare earth elements include, Gd, Tb, Dy, Ho, Er, Tm, Yb, and Lu.

Also, substantially neither yttrium (Y) nor lanthanum (La) may be included. Here, "substantially neither yttrium (Y) nor lanthanum (La) may be included" means that a total amount of Y and La to R is 0.5 mass % or less. In the case that Y and La are substantially included, the below described R-T phase is unlikely to form, and it becomes difficult for S(R-T) to be 0.60 or larger. Further, it becomes difficult to attain HcJ improvement effect derived from the R-T phase. Further, in the case of including Y, anisotropic magnetic field of the main phase grains tend to decrease easily. In the case of including La, anisotropic magnetic field of the main phase grains tends to decrease easily, and corrosion resistance tends to decrease easily.

The R-T-B based sintered magnet may or may not include C. An amount of C may be within a range of 0 mass % or more and 0.3 mass % or less.

An amount of Fe may be a substantial balance in constituents of the R-T-B based sintered magnet. Here, "the amount of Fe is a substantial balance" means that elements other than the group consisting of R, B, Co. Ga, Al, Cu, Zr, and C are Fe and inevitable impurities. Further, an amount of inevitable impurities may be 0.5 mass % or less (including 0) in total with respect to the R-T-B based sintered magnet.

(Microstructure)

In below, an R-T-B based sintered magnet 1 is described using figures, particularly using FIG. Note that, FIG. 1 is a backscattered electron image obtained by observing a cross section of Example 1 described in below by using a field emission scanning electron microscope (FE-SEM). The backscattered electron image obtained by observation using an FE-SEM may be simply referred to as a SEM image in some cases.

When one cross section of the R-T-B based sintered magnet 1 is observed using SEM, as shown in FIG. 1, a main phase grain 11 and a plurality of types of grain boundary phases which are existing in the grain boundary can be observed. Further, the plurality of types of grain boundary phases has different color shades depending on the compositions, and different shapes depending on crystalline types.

For example, using an Energy Dispersive X-ray Spectroscopy (EDS), an Energy Probe Microanalyzer (EPMA), a Transmission Electron Microscope (TEM), or so on which are attached with FE-SEM, point analysis of each grain boundary phase is carried out to identify the composition, thereby the grain boundary phase can be specified.

Further, a crystal structure of each grain boundary phase may be determined using a Transmission Electron Microscope (TEM). By determining the crystalline structure of each grain boundary phase using TEM, the grain boundary phase can be identified further specifically.

As shown in the SEM image of FIG. 1, the R-T-B based sintered magnet 1 includes the main phase grains 11 and the grain boundary formed between the main phase grains 11. The main phase grains 11 are made of an $R_2T_{14}B$ compound. The $R_2T_{14}B$ compound is a compound having a tetragonal crystalline structure of $R_2T_{14}B$ type. The main phase grain 11 appears in black color in the SEM image. A size of the main phase grain 11 is not particularly limited, and a circle equivalent diameter may be within a range of about 1.0 μm to 10.0 μm.

The grain boundary includes a grain boundary multiple junction and a two grain boundary. The grain boundary multiple junction is a grain boundary surrounded by three or more main phase grains, and the two grain boundary is a grain boundary that exists between adjacent two main phase grains.

The grain boundary includes at least two types of grain boundary phases. In FIG. 1, the grain boundary includes an R-T phase 13 and an R-rich phase 15. Note that, when brightness of the main phase grain 11, brightness of the R-T phase 13, and brightness of the R-rich phase 15 are compared in a SEM image, the main phase grain 11 appears the darkest, and the R-rich phase 15 appears the brightest.

In the R-T phase 13, a proportion of R to T in terms of atomic ratio is about 1:2. Specifically, an amount of R of R-T phase 13 may be within a range of 20.0 at % or more and 40.0 at % or less; and an amount of T may be within a range of 55.0 at % or more and 80.0 at % or less. Further, an amount of elements other than R and T included in the R-T phase 13 is 10.0 at % or less. Note that, a total amount of R, T, and elements other than R and T is an amount which does not consider the amount of oxygen (O), C, and nitrogen (N).

The R-rich phase 15 refers to a phase having 40.0 at % or more of the amount of R and having smaller amount of T than the R-T phase 13. The amount of T may be 55.0 at % or less. Note that, the amount of R and the amount of T are amounts which do not consider O, C, and N.

In one cross section of the R-T-B based sintered magnet, an area ratio of R-T phase 13 to the grain boundary which is represented by S(R-T) is within a range of 0.60 or larger and 0.85 or smaller.

Regarding the R-T-B based sintered magnet using Ce as a rare earth element which costs less but lowers HcJ compared to Nd and Pr, when S(R-T) is within the above-mentioned range, the present inventors have found that HcJ can be improved. The mechanism regarding the improvement of HcJ when S(R-T) is within the above-mentioned range is not necessarily clear. The present inventors speculate the below described mechanism.

The R-rich phase 15 facilitates separation of magnetism of the main phase grain 11. As a result, by including the R-rich phase 15, HcJ can be improved.

The R-T phase 13 tends to have larger amount of Ce with respect to the total amount of R compared to the main phase grain 11. This is because when R-T phase 13 is formed, Ce is released from the main phase grain 11. As a result, R other than Ce in the main phase grain 11 increases, specifically the amount of Nd in the main phase grain 11 increases. Thus, anisotropic magnetic field in the main phase grain 11 increases.

When the R-rich phase 15 and the R-T phase 13 are included so that S(R-T) is within a range of 0.60 or larger and 0.85 or smaller, both of an effect of facilitating the separation of magnetism of the main phase grain 11 and an effect of releasing Ce from the main phase 11 are exhibited. As a result, the R-T-B based sintered magnet having a high HcJ can be obtained.

Note that, the area ratio of the R-rich phase 15 to the grain boundary is not particularly limited, and part other than the R-T phase 13 in the grain boundary may be the R-rich phase 15. Specifically, an area ratio of phase other than the R-rich phase 15 and an R-T phase 13 with respect to the grain boundary may be 10.00% or less (includes 0%).

An area of the observation field of the SEM image for calculating S(R-T) is not particularly limited as long as it is a sufficient area for calculating S(R-T). For example, an area of the observation field may be 0.01 $mm^2$ or larger.

(Production Method)

In below, an example of a method of producing the R-T-B based sintered magnet is described. The method of producing the R-T-B based sintered magnet includes below described steps.

(a) An alloy preparation step for producing an R-T-B based sintered magnet alloy (raw material alloy).

(b) A pulverization step for pulverizing the raw material alloy and to obtain an alloy powder.

(c) A pressing step for pressing the obtained alloy powder and to obtain a green compact.

(d) A sintering step for sintering the obtained green compact to obtain the R-T-B based sintered magnet.

(e) An aging treatment step for aging the R-T-B based sintered magnet.

(f) A machining step for machining the R-T-B based sintered magnet, (g) A grain boundary diffusion step for diffusing a heavy rare earth element in the grain boundary of the R-T-B based sintered magnet.

(h) A surface treatment step for surface treating the R-T-B based sintered magnet.

[Alloy Preparation Step]

An R-T-B based sintered magnet alloy is prepared (alloy preparation step), In below, a strip casting method is explained as an example of the alloy preparation step, however, the alloy preparation step is not limited to a strip casting method.

Raw material metals matching the composition of the R-T-B based sintered magnet are prepared, and the raw material metals prepared under vacuumed atmosphere or inert gas atmosphere such as Ar gas are melted. Then, by casting the melted raw material metals, a raw material alloy which is a raw material of the R-T-B based sintered magnet is produced. Note that, in below description, a one-alloy method is explained, however, a two-alloy method which obtains the raw material powder by mixing two alloys of a first alloy and a second alloy may be used.

Types of the raw material metals are not particularly limited. For example, rare earth metals, pure iron, pure cobalt, compounds such as ferroboron (FeB), alloys such as rare earth element alloy, and so on may be used. A casting method for casting the raw material metals is not particularly limited. For example, an ingot casting method, a strip casting method, a book mold casting method, a centrifugal casting method, and so on may be mentioned. If needed, a homogenization treatment (solution treatment) may be carried out to the obtained raw material alloy, when solidification segregation is found.

[Pulverization Step]

After the raw material alloy is produced, the raw material alloy is pulverized (pulverization step). The pulverization step may be carried out in a two-step process which includes a coarse pulverization step of pulverizing the alloy to a particle size of about several hundred μm to several mm; and a fine pulverization step of finely pulverizing to a particle size of about several μm. However, a single-step process consisting solely of a fine pulverization step may be carried out, (Coarse Pulverization Step)

During the coarse pulverization step, the raw material alloy is coarsely pulverized till the particle size becomes approximately several hundred μm to several mm (coarse pulverization step). Thereby, a coarsely pulverized powder of the raw material alloy is obtained. For example, coarse pulverization can be done by first storing hydrogen into the raw material alloy, then dehydrogenating by releasing hydrogen based on the differences of hydrogen stored amount in different phases which causes self-collapsing pulverization (hydrogen storage pulverization). Conditions of the dehydrogenation are not particularly limited, for example, it may be carried out at a temperature within a range of 300 to 650° C. under argon (Ar) flow or in vacuum.

The coarse pulverization method is not limited to the above-mentioned hydrogen storage pulverization. For example, coarse pulverization may be carried out using a coarse pulverizer such as a stamp mill, a jaw crusher, a brown mill, and so on under inert gas atmosphere.

In order to obtain the R-T-B based sintered magnet having high magnetic properties an atmosphere of each step from the pulverization step to the sintering step may be a low oxygen concentration atmosphere. The oxygen concentration is adjusted by controlling atmosphere at each step of the production. If the oxygen concentration at each step of the production is high, the rare earth element in the alloy powder obtained by pulverizing the raw material alloy is oxidized and R oxide is generated. The R oxide is not reduced after the sintering step; hence it is deposited in the grain boundary as R oxide. As a result, coercivity HcJ of the obtained R-T-B based sintered magnet tends to decrease easily. Thus, for example, each step (fine pulverization step, pressing step) may be carried out under the atmosphere having oxygen concentration of 100 ppm or less.

(Fine Pulverization Step)

After coarsely pulverizing the raw material alloy, the obtained coarsely pulverized powder is finely pulverized till the average particle size becomes several μm or so (fine pulverization step). Thereby, a finely pulverized powder of raw material alloy can be obtained. D50 of the particles included in the finely pulverized powder is not particularly limited. For example, D50 may be within a range of 1.0 μm or larger and 10.0 μm or smaller.

The fine pulverization is carried out by adjusting conditions of fine pulverization such as pulverization time and so on, and by further pulverizing the powder obtained by coarse pulverization using a fine pulverizer such as a jet mill or so. Below explains a jet mill. A jet mill is a fine pulverizer in which a high-pressure inert gas (for example, He gas, $N_2$ gas, and Ar gas) is released from a narrow nozzle to generate a high-speed gas flow, and this high-speed gas flow accelerates the coarsely pulverized powder of a raw material alloy to collide against each other or collide with a target or a container wall.

When the coarsely pulverized powder of the raw material alloy is finely pulverized, for example, a lubricant such as an organic lubricant or a solid lubricant may be added. As the organic lubricant, oleic amide, lauramide, zinc stearate, and the like may be mentioned. As the solid lubricant, for example, graphite and the like may be mentioned. By adding the lubricant, a finely pulverized powder can be obtained which tends to be easily oriented when magnetic field is applied during the pressing step. Either one of the organic lubricant or the solid lubricant may be used, or both of them may be mixed and used.

[Pressing Step]

The finely pulverized powder is pressed into a desired shape (pressing step). The pressing step is carried out by placing the finely pulverized powder in a mold arranged in magnetic field, and then applying a pressure, thereby the finely pulverized powder is pressed and a green compact is obtained. At this time, by carrying out pressing while applying a magnetic field, the finely pulverized powder can be pressed while orienting a crystal axis of the finely pulverized powder in a specific direction. Since the obtained green compact is oriented in a specific direction, the R-T-B based sintered magnet having even higher magnetic anisotropy is obtained. While carrying out pressing, a pressing aid may be added. A type of the pressing aid is not particularly limited. The above-mentioned lubricant may be used.

During pressure application, for example, pressure within a range of 30 MPa or more and 300 MPa or less may be applied. For example, as magnetic field applied, magnetic field within a range of 1.0 T or larger and 5.0 T or smaller may be applied. The applied magnetic field is not limited to static magnetic field, and it may also be pulse magnetic field. Also, static magnetic field and pulse magnetic field may be used together.

Note that, as a pressing method, a dry pressing method which directly presses the finely pulverized powder as mentioned in above, or a wet pressing method which presses a slurry having the finely pulverized powder is dispersed in a solvent such as oil and so on may be used.

A shape of the green compact obtained by pressing the finely pulverized powder is not particularly limited, and it can be a shape matching a desired shape of the R-T-B based sintered magnet such as a rectangular parallelepiped shape, a flat plate shape, a columnar shape, a ring shape, a C-like shape, and so on.

[Sintering Step]

The obtained green compact is sintered in vacuum or in inert gas atmosphere to obtain the R-T-B based sintered magnet (sintering step). A sintering temperature needs to be regulated depending on various conditions such as a composition, a pulverization method, an average of the particle size and particle size distribution, and so on A sintering temperature is not particularly limited, and for example, it may be within a range of 950'C or higher and 1100° C. or lower. A sintering time is not particularly limited, and it may be within a range of 2 hours or longer and 10 hours or shorter. A sintering atmosphere is not particularly limited. For example, it may be inert gas atmosphere, or may be in vacuum atmosphere of less than 100 Pa.

[Aging Treatment Step]

After sintering the green compact, aging treatment is performed to the R-T-B based sintered magnet (aging treatment step). After sintering, the aging treatment is performed to the obtained R-T-B based sintered magnet at a temperature lower than a temperature during the sintering step.

Conditions of aging treatment may be, an aging temperature within a range of 550° C. or higher and 650° C. or lower, and an aging time within a range of 10 minutes or longer and 300 minutes or shorter. When R includes Ce and an amount of Ce to R is within a range of 15 mass % or more and 35 mass % or less, S(R-T) can be easily within the predetermined range by carrying out the aging treatment under the above-mentioned conditions.

When the aging treatment temperature is too low, S(R-T) tends to become too large. When the aging treatment temperature is too high, S(R-T) tends to become too small. In either case, HcJ cannot be improved. Also, when the aging treatment temperature is too high, even though a phase in a SEM image has brightness which appears to be an R-T phase, the case that such phase is actually not R-T phase increases since when point analysis is actually carried out, a ratio of R to T is significantly disproportioned from 1:2.

Atmosphere while carrying out the aging treatment is not particularly limited. For example, the atmosphere may be inert gas atmosphere (such as He gas, Ar gas) with pressure higher than atmospheric pressure. Also, the aging treatment step may be carried out after the machining step described in below.

[Machining Step]

The obtained R-T-B based sintered magnet may be machined into a desired shape if needed (machining step). A machining method may, for example, be shape processing such as cutting and grinding, and chamfering such as barrel polishing.

[Grain Boundary Diffusion Step]

Heavy rare earth elements may be further diffused to the grain boundary of the machined R-T-B based sintered magnet (grain boundary diffusion step). A method of grain boundary diffusion is not particularly limited. For example, a compound including the heavy rare earth elements may be adhered on a surface of the R-T-B sintered magnet by coating, deposition, and the like, and then the heat treatment may be carried out, thereby the grain boundary diffusion may be performed. Also, the R-T-B based sintered magnet may be heat treated under the atmosphere including vapor of heavy rare earth elements. By carrying out the grain boundary diffusion, HcJ of the R-T-B based sintered magnet can be further improved.

[Surface Treatment Step]

The R-T-B based sintered magnet obtained by going through the above-mentioned steps may be further subjected to a surface treatment such as plating, resin coating, an oxidizing treatment, and a chemical treatment, and so on (surface treatment step). Thereby, corrosion resistance can be further improved.

Note that, in the above-mentioned production method, the machining step, the grain boundary diffusion step, and the surface treatment step are performed, however, these steps do not necessarily have to be carried out.

The R-T-B based sintered magnet obtained as described in above becomes an R-T-B based sintered magnet having a good HcJ while including Ce.

The present disclosure is not limited to the above-mentioned embodiment, and various modifications may be applied within a scope of the present disclosure. For example, the permanent magnet according to the present disclosure may be produced using a hot working method, That is, as long as Ce is included within a predetermined range, an R-rich phase and an R-T phase are included, and S(R-T) is within a range of 0.60 or larger and 0.85 or smaller, the permanent magnet according to the present disclosure may be a permanent magnet other than a sintered magnet.

The R-T-B based permanent magnet of the present disclosure can be used as a general R-T-B based permanent magnet. For example, it can be used for a rotating machine for automobile and so on.

EXAMPLES

Hereinbelow, the present disclosure is described in detail using examples, however, the present disclosure is not limited thereto.

(Alloy Preparation Step)

As raw material alloys, alloys A to F having compositions shown Table t were prepared, Note that, TRE refers to a total amount of rare earth elements. An amount of the rare earth elements which are not shown in Table 1 was less than 0.01 mass % in total.

First, raw material metals including predetermined elements were prepared. As the raw material metals, Nd, Pr, Ce, Fe, Co, FeB, Al, Cu Zr, and Ga each having purity of 99.9% were prepared.

Next, these raw material metals were weighed so as to obtain the alloys having the compositions shown in Table 1, then thin plate shape raw material alloys having compositions shown in Table 1 were prepared using a strip casting method. Then, for each sample, an alloy indicated in Table 2 was selected as the raw material alloy.

(Pulverization Step)

The raw material alloy obtained after the alloy preparation step was pulverized, and an alloy powder was obtained. The raw material alloy was pulverized in two steps of a coarse pulverization and a fine pulverization. The coarse pulverization was carried out using hydrogen storage pulverization. After storing hydrogen in the raw material alloy at room temperature, dehydrogenation was carried out while flowing Ar at 600° C. for 5 hours. By carrying out coarse pulverization, an alloy powder having particle sizes within a range of several hundred μm to several mm was obtained.

The fine pulverization was carried out under high pressure nitrogen gas atmosphere by adding 0.1 parts by mass of oleic amide as a lubricant to 100 parts by weight of the alloy powder obtained by coarse pulverization, then these were mixed using a jet mill to obtain a mixed powder. Fine pulverization was carried out until D50 of the alloy powder was about 3.5 μm or so.

(Pressing Step)

The obtained mixed powder by the pulverization step was pressed in magnetic field to obtain a green compact, After the mixed powder is placed in a mold arranged in electromagnets, pressing was carried out by applying pressure while also applying magnetic field using electromagnets. Specifically, the mixed powder was pressed by applying pressure of 110 MPa in magnetic field of 2.2 T. A direction of the magnetic field application was perpendicular to a direction of pressure application.

(Sintering Step)

The obtained green compact was sintered to obtain a sintered body. A sintering temperature was 1000° C. and a sintering time was 4 hours, thereby the sintered body was obtained. Sintering was carried out in vacuumed atmosphere.

(Aging Treatment Step)

The obtained sintered body was subject to an aging treatment to obtain an R-T-B based sintered magnet. For aging treatment, an aging treatment temperature was as shown in Table 2, and an aging treatment time was 1.5 hours.

(Evaluation)

Compositional analysis was carried out using a fluorescence X-ray analysis, an inductively coupled plasma emission spectroscopic analysis (ICP analysis), and a gas analysis to verify that the composition of the obtained R-T-B based sintered magnet at the end of each example and each comparative example had the same composition as the raw material alloy.

The magnetic properties of the R-T-B based sintered magnet formed from the raw material alloy of each example and comparative example was measured using a BH tracer. As one magnetic property, HcJ was measured at room temperature. Results are shown in Table 2. HcJ of 1400 kA/m or larger was considered good.

In below, a method of calculating a value of anisotropic magnetic field (Ha) calculated from a composition of each R-T-B based sintered magnet is described.

First, the composition of each alloy shown in Table 1 was converted into at %. The results of conversion are shown in Table 3.

Next, for the composition of each alloy, the atomic ratio of the amount of each rare earth element to a total amount of rare earth elements was calculated. Results of calculation are shown in Table 4.

In the case that only one type was used as R, such as $Nd_2Fe_{14}B$ crystal. $Pr_2Fe_{14}B$ crystal, $Ce_2Fe_{14}B$ crystal, and so on, a literal value of Ha of $R_2Fe_{14}B$ crystal is known. The literal value is shown in Table 4.

Further, the literal value of Ha of $R_2Fe_{14}B$ crystal including each rare earth element and the atomic ratio of each rare earth element were multiplied, and the obtained values were summed. Thereby, the calculated value of Ha calculated from the composition of each $R_2Fe_{14}B$ alloy was obtained. The calculated values are shown in Table 4. Also, the calculated value of Ha is shown accordingly on Table 1 and Table 2.

In the present examples, a ratio of HcJ to the calculated value of Ha was calculated. That is, the ratio of HcJ of the actually obtained R-T-B based sintered magnet to the calculated value of Ha of $R_2T_{14}B$ alloy was evaluated Table 2 shows the results. HcJ/Ha of 28.00% or higher was considered good, and 29.75% was considered even better. The higher the ratio HcJ/Ha was, it can be said that the coercivity was efficiently enhanced.

The area ratio S(R-T) of the R-T phase to the grain boundary was calculated by a method described in below.

First, the R-T-B based sintered magnet was embedded in an epoxy-based resin. Then, the R-T-B based sintered magnet was cut, and the obtained cross section was polished. For polishing, a commercially available abrasive paper was used. Specifically, plurality of types of commercially available abrasive papers of Nos. 180 to 2000 were prepared. Further, starting from abrasive papers of the lower numbers, the cross section of the R-T-B based sintered magnet was polished. Then at the end, buff and diamond abrasive grains were used for polishing. Note that, liquid such as water and so on was not used for polishing, in order to avoid corrosion of components included in the grain boundary.

Figure 2:
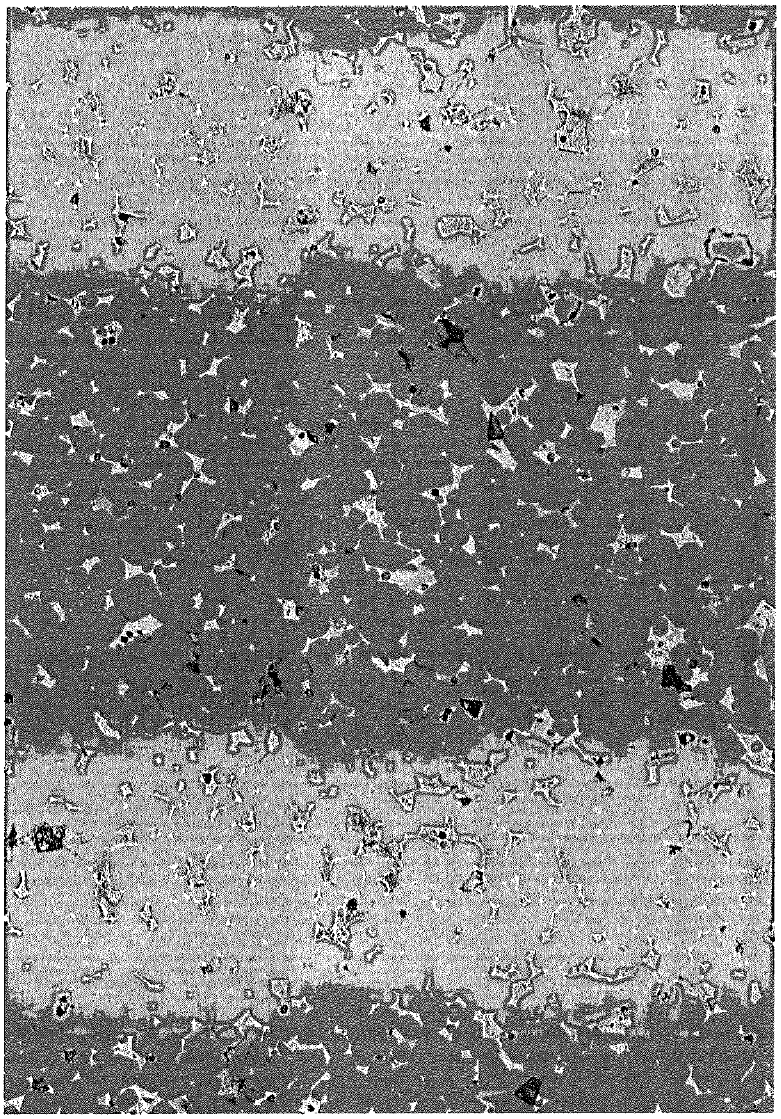
FIG. 2 is a SEM image of Comparative example 2.
Figure 3:
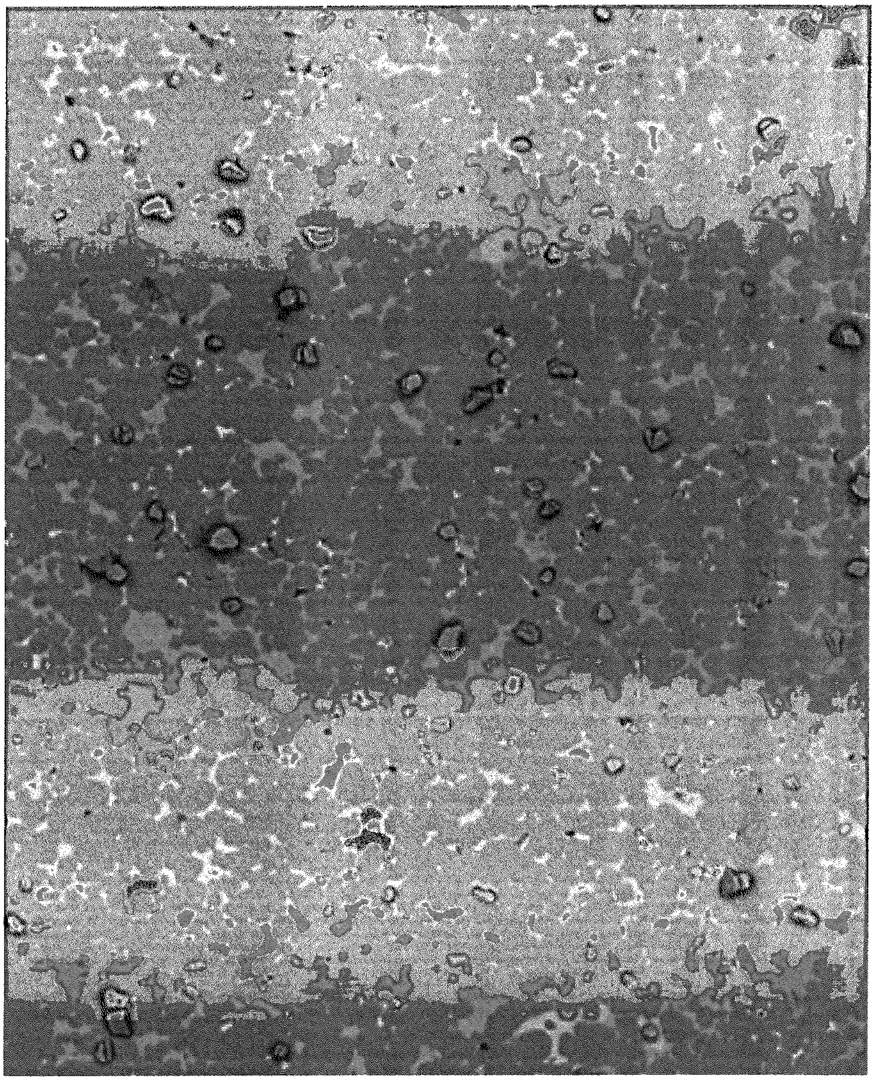
FIG. 3 is a SEM image of Comparative example 3.
Figure 4:
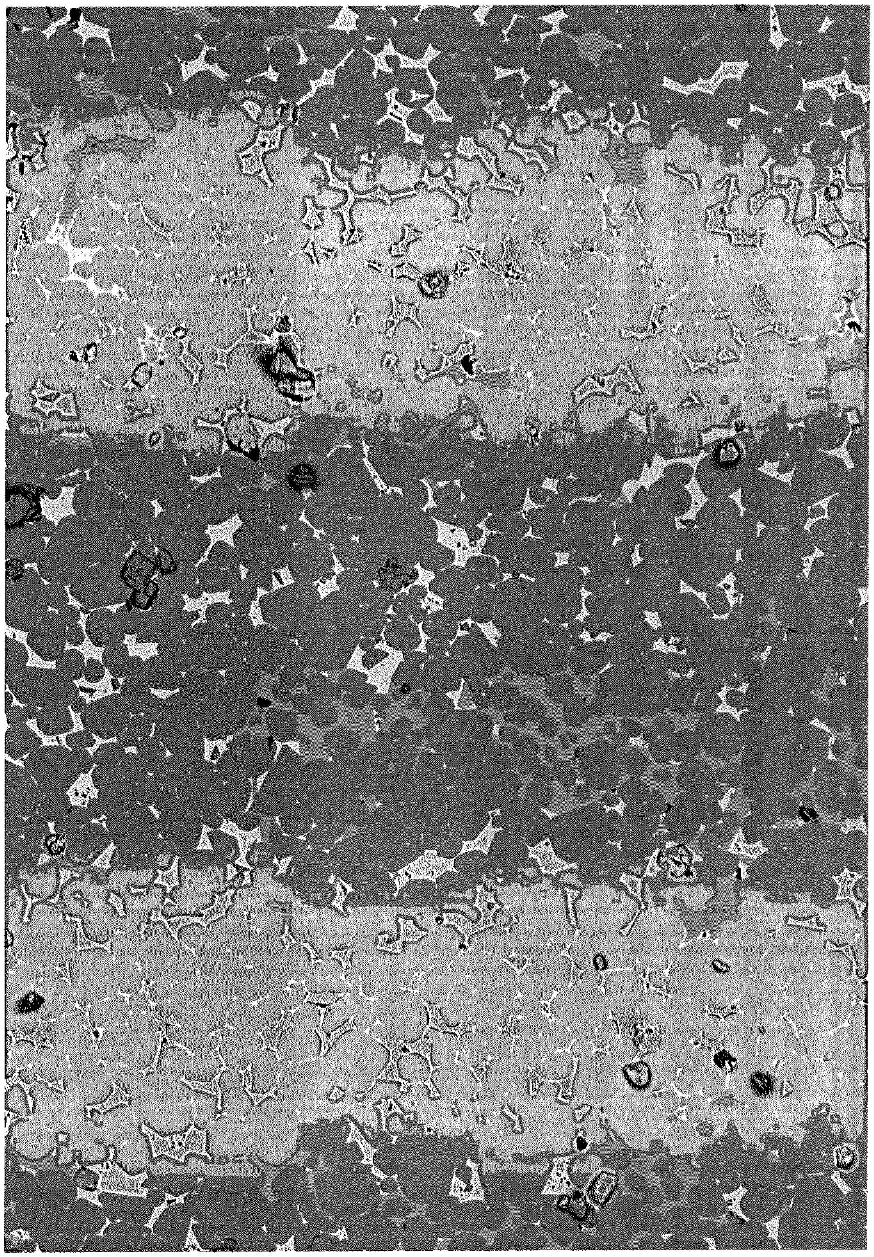
FIG. 4 is a SEM image of Comparative example 4.

The cross section of the obtained sintered body was subject to an ion milling treatment, and influence such as an oxide layer, a nitride layer, and so on at the outermost surface was removed. Next, cross section of the sintered body was observed using a FE-SEM. The observation magnification was 1000×. Based on the contrasts on the backscattered electron image obtained from observation, the presence of main phase grains and grain boundaries were confirmed, and also the presence of a plurality of types of grain boundary phases in the grain boundary (grain boundary multiple junction) was confirmed. Also, by carrying out point analysis of the grain boundary phases appropriately using EDS installed to FE-SEM, it was confirmed that an R-rich phase and an R-T phase were included in the grain boundary in all of experiment examples except for Comparative example 2. An R-T phase was not included in Comparative example 2. Note that, point analysis analyzed the elements which were intentionally added while producing the raw material alloy, that is, the amounts of the elements shown in Table 1 were analyzed. Further, the area ratio S(R-T) of the R-T phase to the grain boundary was calculated. Results are shown in Table 2. Note that, FIG. 1 is a backscattered electron image of Example 1, FIG. 2 is a backscattered electron image of Comparative example 2, FIG. 3 is a backscattered electron image of Comparative example 3, and FIG. 4 is a backscattered electron image of Comparative example 4.

TABLE 1

| Alloy | TRE | Nd | Pr | Ce | Co | B | Al |
|---|---|---|---|---|---|---|---|
| | Unit:Mass % | | | | | | |
| A | 33.00 | 20.99 | 5.41 | 6.60 | 2.00 | 0.83 | 0.50 |
| B | 33.00 | 22.30 | 5.75 | 4.95 | 2.00 | 0.83 | 0.50 |
| C | 33.00 | 17.05 | 4.40 | 11.55 | 2.00 | 0.83 | 0.50 |
| D | 33.85 | 19.88 | 0.00 | 13.97 | 0.51 | 0.82 | 0.14 |
| E | 33.00 | 20.99 | 5.41 | 6.60 | 2.00 | 0.83 | 0.50 |
| F | 33.00 | 20.99 | 5.41 | 6.60 | 2.00 | 0.83 | 0.50 |

TABLE 1-continued

| Alloy | Cu | Zr | Ga | Fe | Ha (kOe) | Ha (kA/m) |
|---|---|---|---|---|---|---|
| | Unit:Mass % | | | | | |
| A | 0.05 | 0.50 | 0.00 | 63.12 | 62.79 | 4997 |
| B | 0.30 | 0.50 | 0.00 | 62.87 | 64.88 | 5163 |
| C | 0.30 | 0.50 | 0.00 | 62.87 | 56.55 | 4500 |
| D | 0.07 | 0.14 | 0.00 | 64.47 | 51.47 | 4096 |
| E | 0.14 | 0.50 | 0.20 | 62.83 | 62.79 | 4997 |
| F | 0.30 | 0.50 | 0.60 | 62.27 | 62.79 | 4997 |

TABLE 2

| Sample | Alloy | Ce/TRE (mass ratio) | Ga [mass %] | Aging treatment Temp [° C.] | S(R-T) | HcJ [kA/m] | Ha [kA/m] | HcJ/Ha [%] |
|---|---|---|---|---|---|---|---|---|
| Example 1 | A | 0.20 | 0.00 | 550 | 0.79 | 1490 | 4997 | 29.82 |
| Example 2 | A | 0.20 | 0.00 | 600 | 0.75 | 1522 | 4997 | 30.46 |
| Example 3 | A | 0.20 | 0.00 | 650 | 0.64 | 1504 | 4997 | 30.10 |
| Comparative example 1 | A | 0.20 | 0.00 | 400 | 0.86 | 1279 | 4997 | 25.60 |
| Comparative example 2 | A | 0.20 | 0.00 | 900 | 0.00 | 1130 | 4997 | 22.62 |
| Example 4 | B | 0.15 | 0.00 | 600 | 0.68 | 1536 | 5163 | 29.75 |
| Example 2 | A | 0.20 | 0.00 | 600 | 0.75 | 1522 | 4997 | 30.46 |
| Example 5 | C | 0.35 | 0.00 | 600 | 0.80 | 1426 | 4500 | 31.69 |
| Comparative example 3 | D | 0.41 | 0.00 | 600 | 0.91 | 1109 | 4096 | 27.07 |
| Example 2 | A | 0.20 | 0.00 | 600 | 0.75 | 1522 | 4997 | 30.46 |
| Example 6 | E | 0.20 | 0.20 | 600 | 0.65 | 1469 | 4997 | 29.40 |
| Comparative example 4 | F | 0.20 | 0.60 | 600 | 0.45 | 1362 | 4997 | 27.26 |

TABLE 3

| Alloy | TRE | Nd | Pr | Ce | Co | B | A | Cu | Zr | Ga | Fe |
|---|---|---|---|---|---|---|---|---|---|---|---|
| | Unit:at % | | | | | | | | | | |
| A | 15.44 | 9.72 | 2.57 | 3.15 | 2.27 | 5.13 | 1.24 | 0.05 | 0.37 | 0.00 | 75.51 |
| B | 15.43 | 10.34 | 2.73 | 2.36 | 2.27 | 5.13 | 1.24 | 0.32 | 0.37 | 0.00 | 75.25 |
| C | 15.49 | 7.90 | 2.08 | 5.51 | 2.27 | 5.13 | 1.24 | 0.32 | 0.37 | 0.00 | 75.19 |
| D | 16.00 | 9.29 | 0.00 | 6.72 | 0.59 | 5.13 | 0.34 | 0.07 | 0.10 | 0.00 | 77.76 |
| E | 15.45 | 9.73 | 2.57 | 3.15 | 2.27 | 5.13 | 1.24 | 0.15 | 0.37 | 0.19 | 75.21 |
| F | 15.47 | 9.74 | 2.57 | 3.15 | 2.27 | 5.14 | 1.24 | 0.32 | 0.37 | 0.58 | 74.62 |

TABLE 4

| Alloy | Nd/TRE (atomic ratio) | $Nd_2Fe_{14}B$ Ha(kA/m) | Pr/TRE (atomic ratio) | $Pr_2Fe_{14}B$ Ha(kA/m) | Ce/TRE (atomic ratio) | $Ce_2Fe_{14}B$ Ha(kA/m) | Calculated value of Ha (kA/m) |
|---|---|---|---|---|---|---|---|
| A | 0.63 | 5330 | 0.17 | 6930 | 0.20 | 2390 | 4997 |
| B | 0.67 | 5330 | 0.18 | 6930 | 0.15 | 2390 | 5163 |
| C | 0.51 | 5330 | 0.13 | 6930 | 0.36 | 2390 | 4500 |
| D | 0.58 | 5330 | 0.00 | 6930 | 0.42 | 2390 | 4096 |
| E | 0.63 | 5330 | 0.17 | 6930 | 0.20 | 2390 | 4997 |
| F | 0.63 | 5330 | 0.17 | 6930 | 0.20 | 2390 | 4997 |

Examples 1 to 3 and Comparative Examples 1 and 2

Examples 1 to 3 and Comparative examples 1 and 2 used the same raw material alloy, and the experiment was carried out under the same conditions except that the aging treatment temperature was changed. The calculated values of Ha were all the same.

Regarding Examples 1 to 3 in which the amount of Ce to the total amount of R was within a range of 15 mass % or more and 35 mass % or less, and the aging treatment time was within a range of 550° C. to 650° C., S(R-T) was within a range of 0.60 or larger and 0.85 or smaller. On the contrary to this, Comparative example 1 in which the experiment was carried out under a low aging treatment temperature of 400° C. showed large S(R-T). Comparative example 2 in which the experiment was carried out under a high aging treatment temperature of 900° C. did not include the R-T phase. As a result, Examples 1 to 3 had higher HcJ and HcJ/Ha compared to Comparative examples 1 and 2.

Examples 2, 4, 5 and Comparative Example 3

Examples 4 and 5 and Comparative example 3 used the same sample as Example 2 except that the amount of Ce to the total amount of R was mainly changed. The larger the amount of Ce was, the lower the calculated value of Ha was.

Examples 4 and 5 in which the amount of Ce to the total amount of R was within a range of 15 mass % or more and 35 mass % or less had S(R-T) of 0.60 or higher and 0.85 or less which was the same as Example 2. On the contrary to this, Comparative example 3 which had large amount of Ce to the total amount of R showed increased S(R-T). As a result, Comparative example 3 had lower HcJ/Ha compared to Examples 2, 4, and 5.

Figure 5:
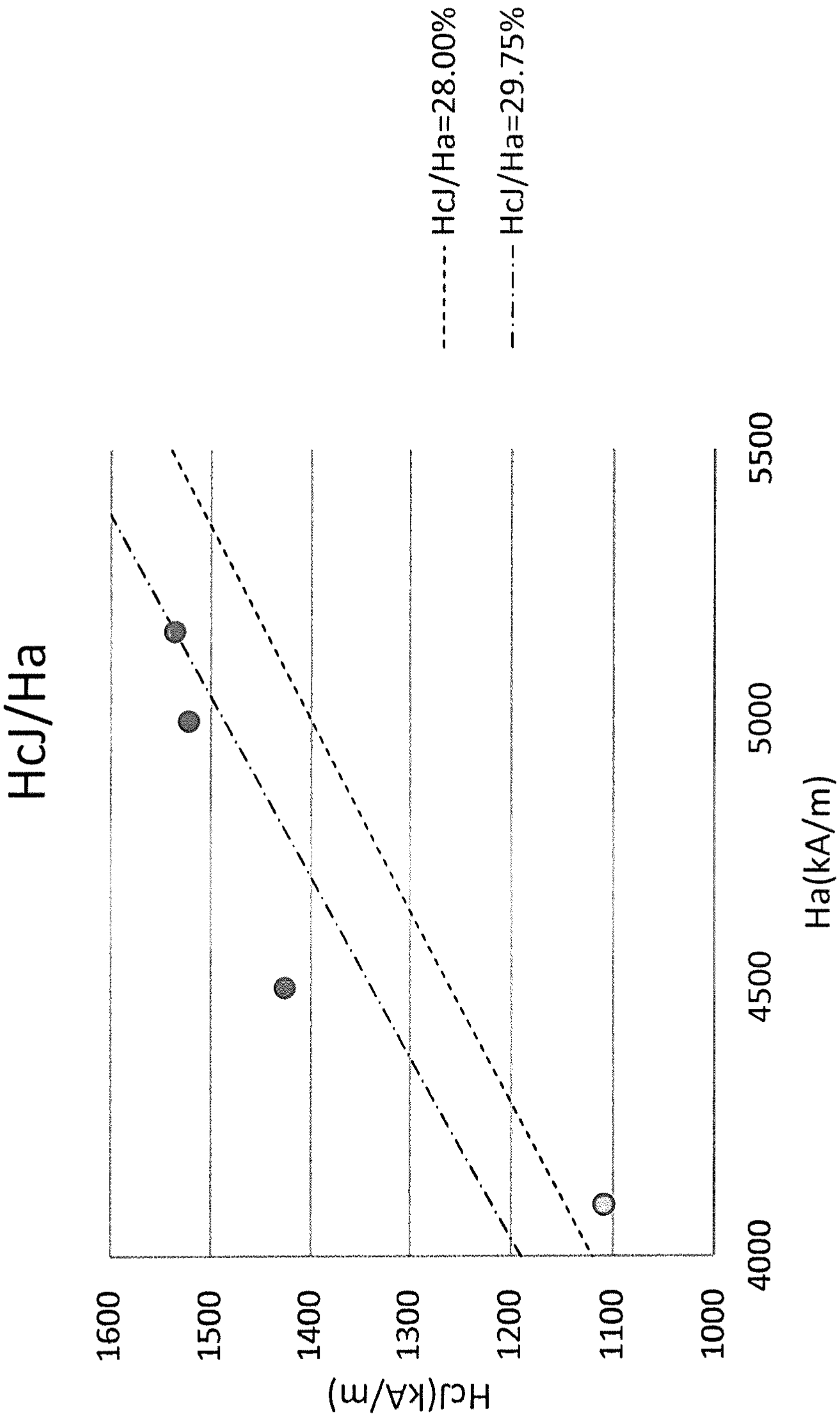
FIG. 5 is a graph showing HcJ on a vertical axis and Ha on a horizontal axis.

FIG. 5 is a graph to which Examples 2, 4, 5, and Comparative example 3 were plotted using Ha on a horizontal axis and HcJ on a vertical axis, and lines of HcJ/Ha at 28.00% and 29.75% were drawn. Each example had large HcJ/Ha, however, Comparative example had small HcJ/Ha.

Examples 2, 6, and Comparative Example 4

Examples 6 and Comparative example 4 used the same sample as Example 2 except that the amount of Ga was mainly changed. All of the calculated values of Ha were the same.

The larger the amount of Ga was, the smaller the S(R-T) was. Examples 2 and 6 of which S(R-T) was within a range of 0.60 or larger and 0.85 or smaller had higher HcJ/Ha compared to Comparative example 4 having small S(R-T).

REFERENCE SIGNS LIST

1 . . . R-T-B based sintered magnet
11 . . . Main phase grain
13 . . . R-T phase
15 . . . R-rich phase

What is claimed is:

1. An R-T-B based permanent magnet comprising main phase grains including an $R_2T_{14}B$ compound (in which R includes a rare earth element, T includes a transition metal element, and B represents boron), and a grain boundary, wherein R at least includes Ce, an amount of Ce to a total amount of R in the R-T-B based permanent magnet is within a range of 15 mass % or more and 35 mass % or less, an amount of Co is within a range of 0.50 mass % or more and 3.00 mass % or less with respect to 100 mass % of the R-T-B based permanent magnet as a whole, the grain boundary includes an R-rich phase and an R-T phase, and an area ratio of the R-T phase to the grain boundary in one cross section of the R-T-B based permanent magnet represented by S (R-T) is within a range of 0.60 or larger and 0.85 or smaller.

2. The R-T-B based permanent magnet according to claim 1, wherein an amount of Ga is within a range of 0 mass % or more and 0.2 mass % or less.

3. The R-T-B based permanent magnet according to claim 1, wherein the R-T-B based permanent magnet include substantially neither La nor Y.

4. The R-T-B based permanent magnet according to claim 2, wherein the R-T-B based permanent magnet include substantially neither La nor Y.

5. The R-T-B based permanent magnet according to claim 1, wherein a total amount of R is within a range of 30.00 mass % or more and 34.00 mass % or less with respect to 100 mass % of the R-T-B based permanent magnet as a whole.

6. The R-T-B based permanent magnet according to claim 1, wherein a total amount of R is within a range of 32.00 mass % or more and 34.00 mass % or less with respect to 100 mass % of the R-T-B based permanent magnet as a whole.

7. The R-T-B based permanent magnet according to claim 1, wherein an amount of B is within a range of 0.70 mass % or more and 0.95 mass % or less with respect to 100 mass % of the R-T-B based permanent magnet as a whole.

8. The R-T-B based permanent magnet according to claim 1, wherein an amount of B is within a range of 0.80 mass % or more and 0.90 mass % or less with respect to 100 mass % of the R-T-B based permanent magnet as a whole.

9. The R-T-B based permanent magnet according to claim 1, wherein the S (R-T) is within a range of 0.60 or larger and 0.80 or smaller.

10. The R-T-B based permanent magnet according to claim 1, wherein the S (R-T) is within a range of 0.64 or larger and 0.80 or smaller.

11. The R-T-B based permanent magnet according to claim 1, wherein an amount of Co is within a range of 2.00 mass % or more and 3.00 mass % or less with respect to 100 mass % of the R-T-B based permanent magnet as a whole.

12. The R-T-B based permanent magnet according to claim 1, wherein an amount of Ga is within a range of 0 mass % or more and 0.20 mass % or less with respect to 100 mass % of the R-T-B based permanent magnet as a whole.

13. The R-T-B based permanent magnet according to claim 1, wherein an amount of Al is within a range of 0.20 mass % or more and 1.00 mass % or less with respect to 100 mass % of the R-T-B based permanent magnet as a whole.

14. The R-T-B based permanent magnet according to claim 1, wherein an amount of Cu is within a range of 0 mass % or more and 0.50 mass % or less with respect to 100 mass % of the R-T-B based permanent magnet as a whole.

15. The R-T-B based permanent magnet according to claim 1, wherein an amount of Zr is within a range of 0.10 mass % or more and 1.00 mass % or less with respect to 100 mass % of the R-T-B based permanent magnet as a whole.

16. The R-T-B based permanent magnet according to claim 1, wherein a total amount of heavy rare earth elements is within a range of 0 mass % or more and 0.10 mass % or less with respect to 100 mass % of the R-T-B based permanent magnet as a whole.

17. The R-T-B based permanent magnet according to claim 1, wherein an amount of C is within a range of 0 mass % or more and 0.3 mass % or less with respect to 100 mass % of the R-T-B based permanent magnet as a whole.

18. The R-T-B based permanent magnetic according to claim 1, wherein elements other than the group consisting of R, B, Co, Ga, Al, Cu, Zr, and C is Fe and inevitable impurities, and an amount of the inevitable impurities is 0 or more and 0.5 mass % or less with respect to 100 mass % of the R-T-B based permanent magnet as a whole.

* * * * *